United States Patent [19]
Therond

[11] Patent Number: 5,594,991
[45] Date of Patent: Jan. 21, 1997

[54] MARKING DEVICE

[76] Inventor: Marcel Therond, 114 Quai du Rhône, Miribel, France, 01700

[21] Appl. No.: 510,467
[22] Filed: Aug. 2, 1995
[30] Foreign Application Priority Data Aug. 8, 1994 [FR] France .................... 94 09970

[51] Int. Cl.$^6$ .............................. B43L 9/00; B43L 13/00
[52] U.S. Cl. ................... 33/18.1; 33/1 M; 33/26
[58] Field of Search ..................... 33/18.1, 1 M, 33/32.1, 32.3, 26, 21.1, 21.2, 397, 556, 559

[56] References Cited

U.S. PATENT DOCUMENTS

| 3,975,831 | 8/1976 | Jysky et al. ............................. 33/397 |
| 4,197,550 | 4/1980 | Held ........................................ 33/18.1 |
| 5,383,277 | 1/1995 | Shimoda et al. ...................... 33/18.1 |
| 5,456,012 | 10/1995 | Therond ................................. 33/18.1 |

FOREIGN PATENT DOCUMENTS

| 0519850 | 6/1992 | European Pat. Off. . |
| 0504691 | 7/1992 | European Pat. Off. . |
| 0611233 | 9/1994 | European Pat. Off. . |

Primary Examiner—Christopher W. Fulton
Attorney, Agent, or Firm—Dowell & Dowell

[57] ABSTRACT

This invention relates to a marking device for making two-dimensional identification signs on the surface of any object, of the type in which the micro-percussion tool is borne axially by a slewable rod which is retained angularly along its axis and which penetrates in a fixed housing through a Universal joint allowing free orientation thereof in all directions along an axis of symmetry, characterized in that orientation of the rod is controlled with the aid of two independent motors which act on one and the other, respectively, of the two orthogonal pivot pins of the joint.

1 Claim, 2 Drawing Sheets

MARKING DEVICE

FIELD OF THE INVENTION

The present invention relates to marking devices used for making figures, letters or other two-dimensional identification signs on the surface of any object maintained immobile.

BACKGROUND OF THE INVENTION

The invention concerns devices of the type described in Patent EP-A-0 519 850 (TECHNIFOR). It will be recalled that, in these devices, the marking tool, of the micro-percussion type, is mounted axially at the end of a slewable rod of which the opposite end penetrates inside a fixed housing through an articulated link constituted equally well by a Universal joint and by a simple ball-joint.

In order to control orientation of the tool-holder rod, the housing contains an actuation mechanism which comprises two telescopic jacks oriented parallel to each other to act on two arms fixed radially on the rod and disposed perpendicularly to each other. One of the two elements of each jack is coupled by a ball-joint to the housing, while the other element is connected, itself by a ball-joint, to the end of the radial arm which corresponds thereto.

In one of the embodiments described in the prior art document mentioned hereinabove, the two actuation jacks are oriented parallel to the axis of symmetry of the slewable rod, being coupled to that wall of the housing opposite the one which bears the articulated link. It will be appreciated that, if this rod is retained angularly against any rotation along its axis, such an actuation mechanism ensurers control of the displacement of the tool under excellent conditions.

However, it should be noted that such an arrangement also presents a substantial drawback, in that, due to the geometry of the assembly, any control exerted by one of the two jacks necesarily involves a correcting action applied to the other jack, even in the case of the device being used for marking rectilinear lines. This permanent correction complicates the electronic apparatus used for controlling the actuation mechanism.

In order to overcome this drawback, Applicants have proposed, in their European Patent Application No. 94 420 041.9 filed on Feb. 9, 1994, disposing the ball-joints which ensure coupling of the telescopic jacks to the fixed housing, in the plane transverse to the slewable rod which passes through the centre of the articulated link interposed between this rod and said housing.

Such structure has proved to be of high performance, but it requires the use of jacks which are always very delicate to control very precisely. It is in this spirit that the present invention has for its object another embodiment which, by employing electric motors of the step-by-step type, makes it possible, at least in the case of the articulated link being constituted by a Universal joint, to simplify actuation of the device while maintaining the same performances.

SUMMARY OF THE INVENTION

The invention relates to a marking device for making two-dimensional identification signs on the surface of any object, of the type in which the micro-percussion tool is borne axially by a slewable rod which is retained angularly along its axis and which penetrates in a fixed housing through a Universal joint allowing free orientation thereof in all directions along an axis of symmetry, characterized in that orientation of the rod is controlled with the aid of two independent motors which act on one and the other, respectively, of the two orthogonal pivot pins of the joint.

In fact, in the case of adopting a Universal joint for the articulated assembly of the tool-holder rod in the fixed housing, the invention consists in associating with each of the two orthogonal pivot pins of this joint an independent motor to ensure angular control of each pin.

This basic arrangement is clearly distinguished from the structure in accordance with document EP-A-0 504 691 (MAUSER). In fact, although this document discloses a machining device equipped with two independent motors (referenced 11 and 13) associated with a tool-holder (referenced 15), it is not a question of a Universal joint, in that, if one (13) of these motors ensures pivoting of said tool-holder about an axis oriented transversely thereto, the other motor (11) effects rotation of the tool-holder assembly about its own axis.

The framework is consequently totally different from that of the Universal joint envisaged in the present invention, to such a point that, even if document EP-A-0 504 691 (MAUSER) were combined with document EP-A-0 519 850 (TECHNIFOR) mentioned hereinbefore, the structure claimed in the present Application would not be reconstituted.

In particular, such a combination would not make it possible to obtain the result sought herein, namely allow the marking of rectilinear lines with the aid of one and the same control.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
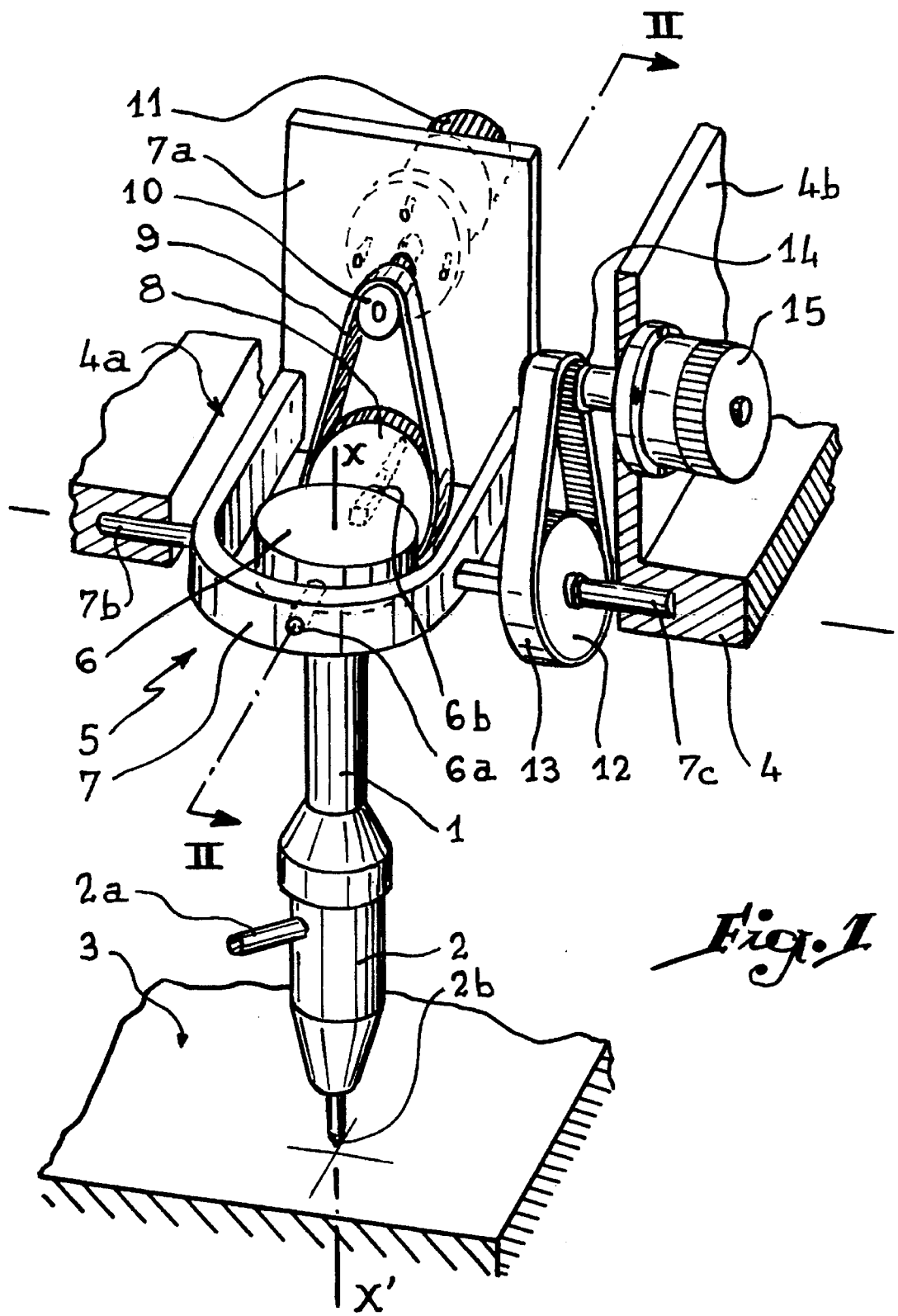
FIG. 1 schematically illustrates in perspective the arrangement of a marking device according to the invention.
Figure 2:
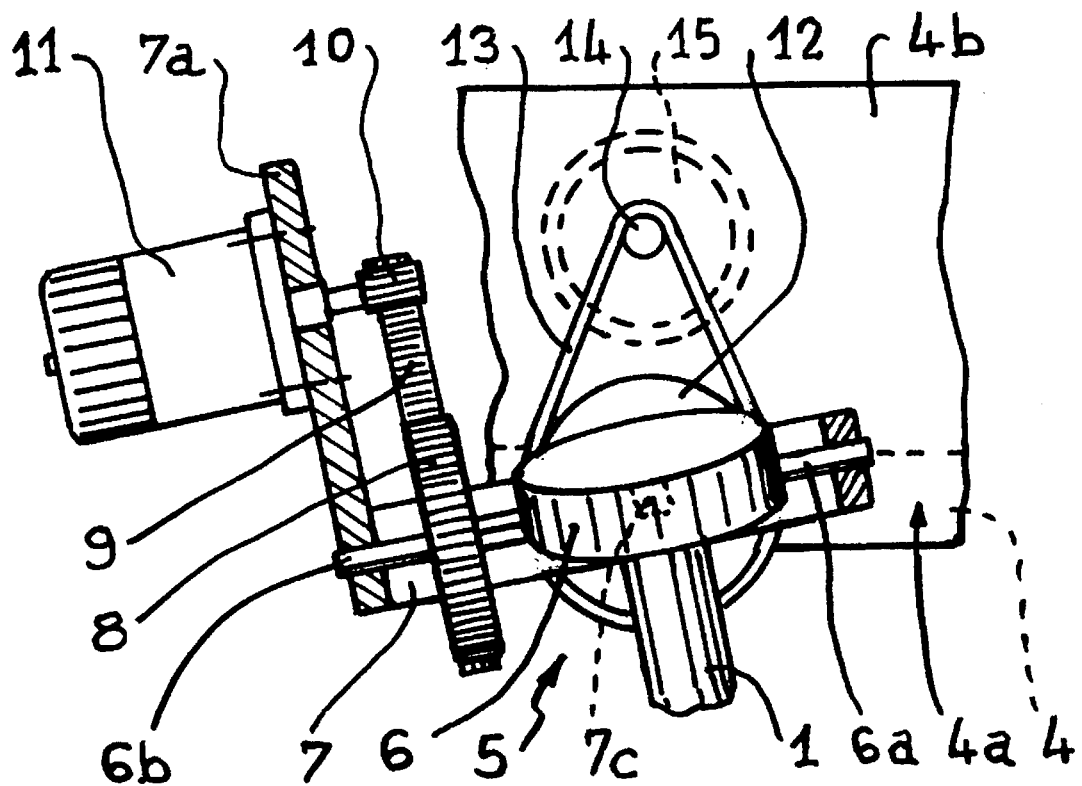
FIG. 2 is a horizontal section along the plane indicated II—II in FIG. 1.

Referring now to the drawings, reference 1 designates the slewable rod which bears along its axis the micro-percussion tool 2 which is supplied pneumatically via a pipe 2a so that its mobile tip 2b marks the surface 3 of the object to be identified. Rod 1 penetrates inside a fixed housing 4 through an opening 4a in which is mounted the Universal joint 5 which supports said rod 1 while allowing it to slew freely in all directions with respect to its axis of symmetry X—X'.

Joint 5 comprises an inner disc 6 provided with two diametrally opposite pivots to form a first pivot axis; pivot 6a is borne by an outer piece 7 of stirrup shape, while the opposite pivot 6b is supported by a vertical plate 7a. Between the disc 6 and the plate 7a there is provided a pulley 8 fitted on the pivot 6b and connected by a synchronous belt 9 to an upper pulley 10 of smaller diameter; this pulley 10 is fixed to the end of the shaft of an electric motor 11 of the step-by-step type.

Like the inner disc 6, the outer stirrup 7 of joint 5 is fast with two opposite pivots 7b and 7c which define a second pivot axis oriented perpendicularly to the first and which are supported in the edges of the opening 4a. Pivot 7c bears a drive pulley 12 which is connected by a synchronous belt 13 to a small pulley 14 fitted on the shaft of a motor 15, identical to motor 11 and borne by a vertical plate 4b fast with housing 4.

It will be readily appreciated that the motors 11 and 15 in no way disturb the articulated coupling of the slewable rod 1 and the fixed housing 4. The structure described above makes it possible to obtain, with the aid of two motors, identically the same mode of control as that produced with the two jacks of European Patent Application No. 94 420 041.9 mentioned above: the production of a rectilinear marking line on the marking surface 3 requires the actuation of one motor, without any correcting action to be made on the other motor. The electronic programmation which ensures automatic actuation of the two motors 11 and 15 is thus simplified.

What is claimed is:

1. Marking device for making two-dimensional identification signs on a surface of an object, of the type in which a micro-percussion tool is borne axially by a slewable rod which is retained angularly along its axis and which penetrates in a fixed housing through a Universal joint allowing free orientation thereof in all directions along an axis of symmetry, wherein orientation of the rod is controlled with the aid of two independent motors which act on one and another, respectively, of two orthogonal pivot pins of the joint.

* * * * *